United States Patent

Hamburg et al.

[11] Patent Number: 5,877,413
[45] Date of Patent: Mar. 2, 1999

[54] SENSOR CALIBRATION FOR CATALYST DETERIORATION DETECTION

[75] Inventors: Douglas Ray Hamburg, Bloomfield Hills; Daniel Lawrence Meyer, Dearborn, both of Mich.

[73] Assignee: Ford Global Technologies, Inc., Dearborn, Mich.

[21] Appl. No.: 86,266

[22] Filed: May 28, 1998

[51] Int. Cl.[6] ................................................. G01M 15/00
[52] U.S. Cl. .......................... 73/118.1; 60/277; 73/23.32; 701/109
[58] Field of Search ................................ 701/109; 60/276, 60/277; 73/116, 117.2, 117.3, 118.1, 23.31, 23.32

[56] References Cited

U.S. PATENT DOCUMENTS

| | | | |
|---|---|---|---|
| 4,691,562 | 9/1987 | Abthoff et al. | 73/118.1 |
| 5,097,700 | 3/1992 | Nakane | 73/118.1 |
| 5,157,921 | 10/1992 | Ito et al. | 73/118.1 |
| 5,267,472 | 12/1993 | Schneider et al. | |
| 5,311,737 | 5/1994 | Komatsu et al. | |
| 5,351,484 | 10/1994 | Wade | |
| 5,414,996 | 5/1995 | Sawada et al. | |
| 5,419,122 | 5/1995 | Tabe et al. | |
| 5,531,069 | 7/1996 | Katsuhiko | |
| 5,591,905 | 1/1997 | Fujimoto et al. | |
| 5,610,321 | 3/1997 | Shinmoto | 73/23.32 |
| 5,655,363 | 8/1997 | Ito et al. | |
| 5,675,367 | 10/1997 | Ries-Mueller | |
| 5,684,248 | 11/1997 | Iwata | |

*Primary Examiner*—George Dombroske
*Attorney, Agent, or Firm*—Donald A. Wilkinson

[57] ABSTRACT

A catalyst system employed in the exhaust stream of an internal combustion engine (10) wherein the catalyst deterioration is monitored by an engine controller (26) connected to a first oxygen sensor (22) mounted upstream of a catalyst (18) and a second oxygen sensor (24) mounted downstream. After a cold start of the engine (10) a calibration of the first and second sensors is conducted, to assure accuracy between the two sensors and determine if one of the sensors has failed, and also a light-off time for the catalyst (18) is determined as one way to measure the deterioration of the catalyst.

11 Claims, 2 Drawing Sheets

SENSOR CALIBRATION FOR CATALYST DETERIORATION DETECTION

FIELD OF THE INVENTION

The present invention relates to catalysts employed to treat exhaust gasses flowing from internal combustion engines and more particularly to detecting deterioration of catalysts over time.

BACKGROUND OF THE INVENTION

In today's vehicles that operate with internal combustion engines, catalysts are used to treat the exhaust gases in order to reduce emissions of certain pollutants. When the vehicle is new, the catalyst will generally operate within its design parameters. But catalyst aging, contaminates, and other factors may cause the effectiveness of the catalyst to be reduced.

In order to monitor the catalyst deterioration, some have suggested locating a pair of oxygen sensors in the exhaust stream, one upstream of the catalyst and one downstream of the catalyst. By comparing the readings from the two sensors, it is proposed that the effectiveness of the catalyst can be determined. But due to various factors that can affect the readings of the two sensors over long term use, and due to the limited accuracy that some methods of determining the deterioration have depending upon when and how the readings are taken, the actual determination of the amount of catalyst deterioration may become inaccurate over time. Thus, it is desirable to have a system for monitoring catalyst deterioration that is initially accurate and will remain accurate over a long period of time.

SUMMARY OF THE INVENTION

In its embodiments, the present invention contemplates a method of testing a catalyst used in the exhaust stream of an internal combustion engine while the engine is operating after a start-up, with the engine having a first oxygen sensor mounted in the exhaust stream upstream of the catalyst and a second oxygen sensor mounted in the exhaust stream downstream of the catalyst. The method comprises the steps of: operating the engine with a lean air/fuel ratio; determining an engine temperature parameter; comparing the temperature parameter to a first predetermined temperature value; comparing the time since engine start-up to a first predetermined time value; reading the outputs of the first and the second sensors if the temperature parameter is less than the first predetermined temperature value and the time since start-up is less than the first predetermined time value; computing the difference between the output from the first sensor and the output from the second sensor; creating an output error message if the difference is greater than a predetermined difference value; and recalibrating one of the first and second sensors if the difference is less than the predetermined difference value and the outputs are not equal.

The present invention further contemplates a method of testing a catalyst used in the exhaust stream of an internal combustion engine while the engine is operating after a start-up, with the engine having a first oxygen sensor mounted in the exhaust stream upstream of the catalyst and a second oxygen sensor mounted in the exhaust stream downstream of the catalyst. This method comprises the steps of: operating the engine with a lean air/fuel ratio; comparing the time from engine start-up to a first predetermined time value; obtaining the outputs of the first and the second sensors if the time from engine start-up is less than the first predetermined time value; computing a first difference value between the output from the first sensor and the output from the second sensor; comparing the first difference to a first predetermined difference value; storing the time since engine start-up if the first difference is greater than the first predetermined difference value; returning to the step of comparing the time from engine start-up if the first difference is not greater than the first predetermined difference value; and creating an output catalyst error message if the time since engine start-up is greater than the first predetermined time value and the first difference is not greater than the first predetermined difference value.

Accordingly, an object of the present invention is to employ oxygen sensors upstream and downstream of a catalytic converter and employ a procedure for comparing the sensor outputs in order to accurately monitor catalyst deterioration over a long period of time.

An advantage of the present invention is that the upstream oxygen sensor and the downstream oxygen sensor can be calibrated to one another as the vehicle ages in order to assure accurate determinations of catalyst deterioration over long periods of time.

An additional advantage of the present invention is that a failure of one of a first upstream oxygen sensor and a second downstream oxygen sensor can be detected and this information output for needed maintenance on the sensors.

Another advantage of the present invention is that the light-off time of the catalyst can be monitored, by comparing the outputs of the upstream and downstream oxygen sensors, and used in the determination of catalyst deterioration over time.

A further advantage of the present invention is that the oxygen storage capability of a catalyst can be accurately determined and used to determine catalyst deterioration over time.

An additional advantage of the present invention is that the sensor calibration between the upstream and downstream sensors can be accomplished prior to determining the light-off time and the oxygen storage capability in order to assure a high accuracy of determining the true deterioration of the catalyst before sending a signal indicating that the catalyst has failed.

DETAILED DESCRIPTION OF THE PREFERRED EMBODIMENTS

Figure 1:
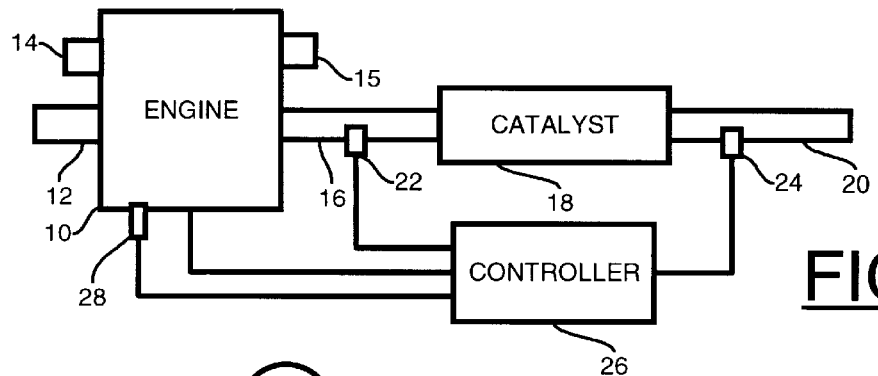
FIG. 1 is a schematic illustration of an internal combustion engine, catalyst and means for determining catalyst deterioration in accordance with the present invention.

FIG. 1 shows an engine 10 having an air intake 12, a fuel system 14, a spark (ignition) assembly 15, and an exhaust conduit 16 for receiving the exhaust from combustion events. The exhaust conduit 16 connects to a catalytic converter 18, through which the exhaust flows, which in turn connects to another exhaust conduit 20 downstream of the catalyst 18.

Mounted in the first exhaust conduit 16 is a first (upstream) oxygen sensor 22, and mounted in the second exhaust conduit 20 is a second (downstream) oxygen sensor 24. These oxygen sensors 22,24 can be any one of several different kinds of sensors which respond to exhaust gas oxygen, and include universal exhaust gas oxygen (UEGO) sensors, used in the exhaust systems of vehicles and known to those skilled in the art. Also, a temperature sensor 28 is mounted to the engine 10 for measuring the temperature of engine coolant. This sensor 28 can measure a different temperature parameter, so long as it is able to indicate how warmed-up the engine 10 is. Both of the oxygen sensors 22,24 and the temperature sensor 28 are in communication with an engine controller 26, which is also in communication with mechanisms on the engine 10 for controlling the intake of fuel and/or air, and spark timing, among other functions.

Figure 2:
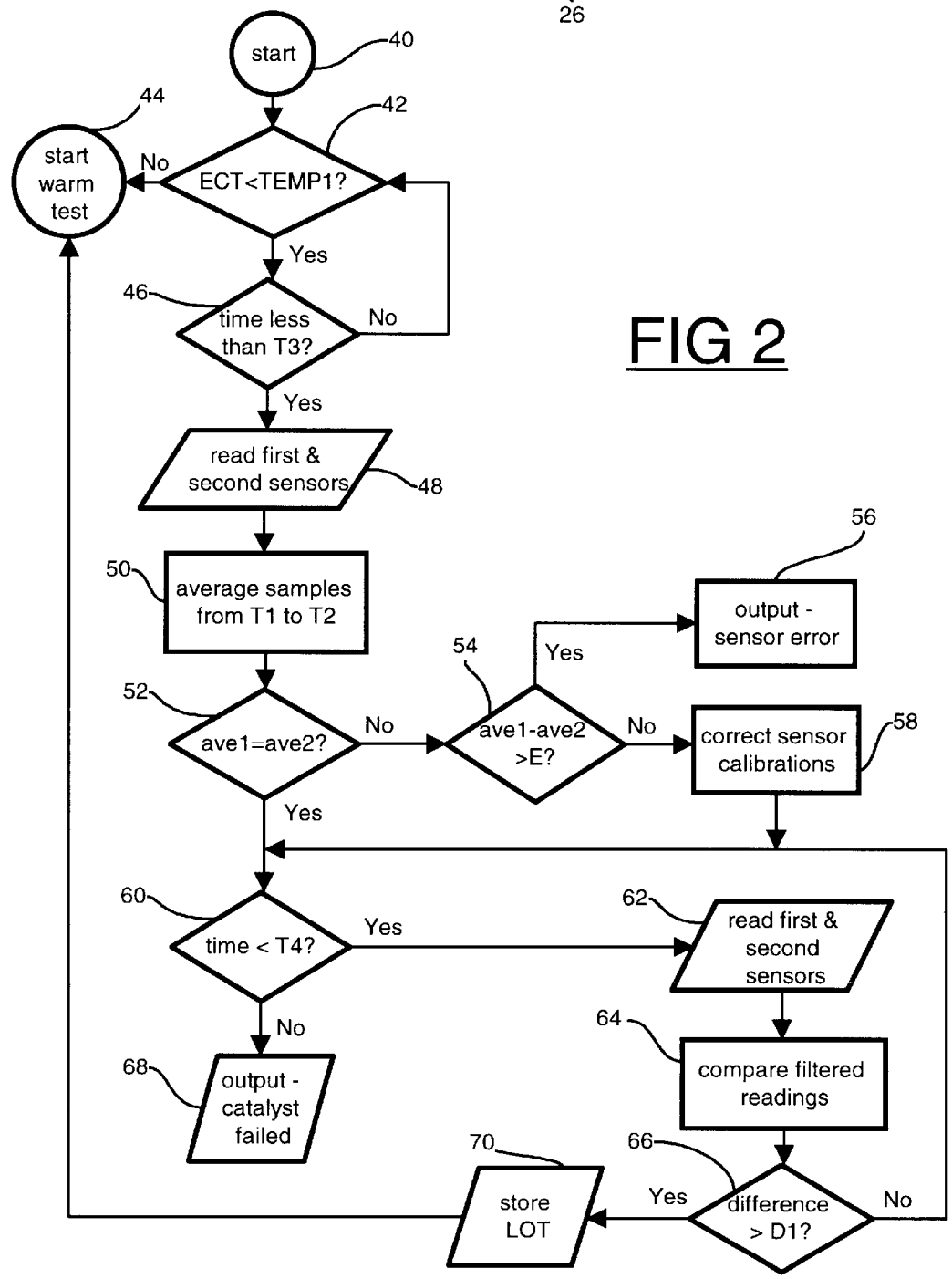
FIG. 2 is a flowchart showing a portion of the catalyst deterioration determination.

FIG. 2 illustrates some of the functions carried out by the assembly of FIG. 1 for determining oxygen sensor calibration and catalyst light-off time (LOT). The process begins with engine start-up 40, after which the engine coolant temperature (ECT) is compared with a predetermined value TEMP1, step 42. TEMP1 is a temperature value that is low enough to indicate that the engine is being started cold, i.e., not warmed-up. If the ECT is greater than TEMP1, then the routine skips to the warm test, discussed below in relation to FIG. 3, step 44.

If the ECT is less than TEMP1, then the engine start-up qualifies as an engine cold start, and the engine air/fuel ratio is typically set to a value of approximately three percent lean of stoichiometry. The time since the engine start-up is then compared with a predetermined time limit T3, step 46. The time T3 will be a limit that is close to but before catalyst light-off, which, for example, may be around thirty seconds or less. If the time since start-up is not less than T3, the routine will cycle back to step 42.

If the time since start-up is less than T3, then the first and second oxygen sensor outputs are read, step 48. These samples are preferably read multiple times over a time period from time T1 to time T2, and then the readings are averaged for each sensor, step 50. As an example, time T1 might be 5 seconds from engine start-up and T2 might be about 15 seconds from engine start-up. Since the time interval is so close to engine start-up, typically the hydrocarbon efficiency of the catalyst in this time interval will be less than about 5%, allowing for a direct comparison between the two sensor outputs. The oxygen sensors 22,24 located upstream and downstream of the catalyst should have generally equal outputs following a cold start of the engine, but may not due to a tendency to drift over time and mileage. The average for the first sensor (AVE1) will then be compared to the average for the second sensor (AVE2), step 52. If a difference in the averages is detected between the two sensors, then a difference value is calculated, step 54. If the difference is above an error threshold E, then this indicates a failure of one of the sensors, which is then output as a sensor error, step 56. If the difference in sensor average readings (AVE1–AVE2) is not unacceptably large, then re-calibration of one or both of the sensors is performed, step 58. Therefore, any measured difference is taken into account and corrected for (calibrated) soon after the beginning of engine operation, before the catalyst becomes active.

This calibration of the sensors 22,24 is preferably done before the routine for determining light-off time and the routine for determining oxygen storage capability in order to improve the accuracy of these catalyst deterioration checks. Also, if a sensor has failed, then the catalyst deterioration routines can be by-passed since properly performing oxygen sensors are needed to obtain accurate catalyst deterioration results.

Now the time since engine start-up is compared to a time limit T4, step 60. The time T4 is a predetermined maximum time at which a properly acting catalyst should have attained at least 50% hydrocarbon conversion efficiency, when the engine is operating lean of stoichiometry. The time T4 may be found from a look-up table or by another means that takes into account engine operating parameters and surrounding environmental conditions to determine the appropriate time interval for a given vehicle and engine combination. If the time since start-up is still less than time T4, then the outputs from both of the sensors 22,24 are read, step 62, and then compared to one another, step 64. The difference between the two sensor outputs is then compared to a predetermined difference value D1, step 66. If the difference between the sensor outputs is not greater than value D1, then the routine returns to step 60. This loop back to step 60 will continue until the difference in outputs is determined to be greater than D1, or the time since engine start-up is not less than T4. The difference value D1 is an indicator that the sensors are giving different outputs due to the catalyst reaching light-off. This is because the sensors will generally read this same value until the catalyst efficiency reaches about 50%. Then, the output values will diverge from one another, since the air/fuel ratio measured by the downstream oxygen sensor tends to be richer as compared to the upstream sensor after the light-off of the catalyst.

If the time T4 occurs without the difference being determined to be greater than D1, then an error message is output, step 68. This error message will indicate that the catalyst is not operating properly. On the other hand, if the difference between the sensor outputs is greater than value D1, at step 66, then this indicates that the catalyst hydrocarbon conversion efficiency has reached 50% within the time limit T4. The time to reach the difference of greater than D1 will now be stored as the light-off time (LOT), step 70. At this point, the routine will move on to the warm test, step 44. By proceeding to a warm test in addition to the light-off time test, the deteriorated state of a catalyst can better be determined because both a slow light-off time and a limited oxygen storage capability can be indicators of a need to rejuvenate or replace a catalyst.

Figure 3:
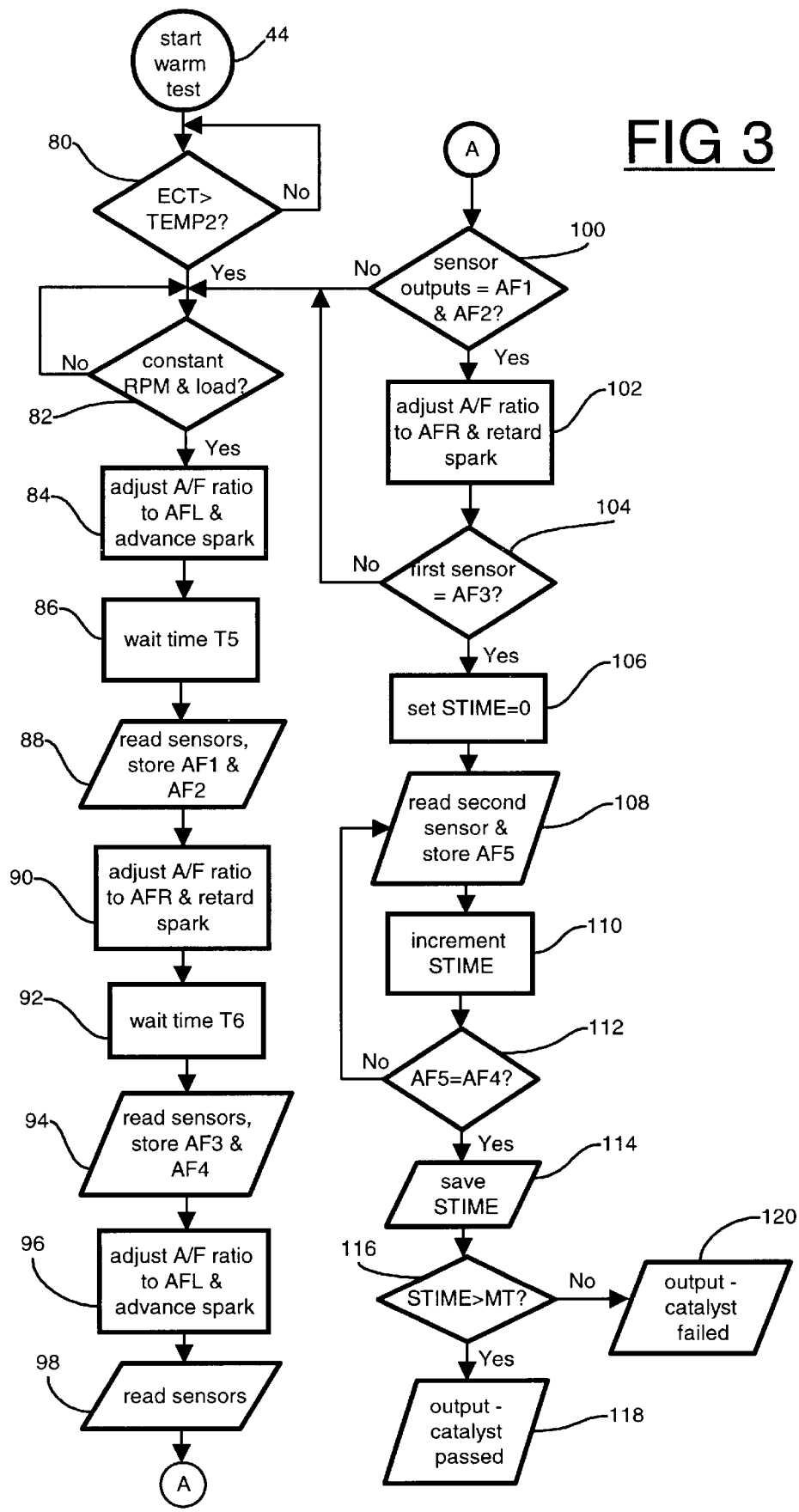
FIG. 3 is a flowchart showing another portion of the catalyst deterioration determination.

FIG. 3 illustrates the portion of the catalyst deterioration routine that starts the warm test, step 44, for the engine assembly of FIG. 1. The ECT is read from the temperature sensor 28 and now compared to a temperature value TEMP2, step 80. The temperature TEMP2 is associated with a condition of the engine 10 that is considered to be fully warmed up. If the ECT is not greater than value TEMP2, the routine loops back and repeats step 80 until the engine 10 warms up more.

When the ECT is greater than TEMP2, the routine continues by having the controller 26 determine if the engine 10 is operating at a constant RMP and load condition, step 82. Since the air/fuel ratio and spark timing must be manipulated for this portion of the catalyst deterioration testing, the engine 10 must be running at essentially a constant rpm and load. If not a constant RPM and load condition, the routine will not proceed.

If RPM and load are constant, then the controller 26 will adjust the air/fuel (A/F) ratio of the engine 10 to a predetermined lean ratio (AFL), step 84. At this time, the spark timing is advanced in order to prevent perceptible changes in engine torque. A time delay of an amount T5 will then occur, step 86, in order to permit the engine 10, catalyst 18 and, the oxygen sensors 22,24 to stabilize. After waiting for time T5, the outputs of the first and second oxygen sensors 22,24 are read and stored as AF1 and AF2, respectively, step 88. After this, the controller 26 adjusts the air/fuel ratio to a predetermined rich ratio (AFR), step 90. The spark timing is also retarded at this time in order to prevent perceptible changes in engine torque. A delay of time T6 then occurs, again in order to allow the system to stabilize, step 92. Then the outputs of the first and second sensors 22,24 are read and stored as AF3 and AF4, respectively, step 94.

The controller 26 again adjusts the air/fuel ratio to AFL, step 96. The spark timing is also again advanced to the previous lean timing. The outputs of the first and second sensors 22,24 are read, step 98, and these values are compared to AF1 and AF2 respectively, step 100. If the first and second sensor outputs are different from AF1 and AF2, respectively, by more than a predetermined amount, then they are considered not equal to them and the routine returns to step 82. This indicates that the sensors may not be operating properly, or that engine operating conditions have changed.

If the first and second sensor outputs are essentially the same as AF1 and AF2, respectively, then the air/fuel ratio is again adjusted to AFR and the spark timing is retarded, step 102. The output of the first sensor 22 is now read and compared to AF3, step 104. If the sensor values are not equal, then the engine operating conditions are assumed to have changed and the routine returns to step 82 and begins again. If the output of the first sensor 22 is about equal to AF3, i.e., within some predetermined range, then the engine operating conditions are considered to be the same as before, and a time value of STIME is set to zero, step 106. Now the output of the second sensor 24 is read and stored as AF5, step 108, and the time value STIME is incremented, step 110. The values AF4 and AF5 are now compared, step 112. This comparison is between output readings for the downstream sensor so no inaccuracies with a comparison to the upstream sensor will be introduced. If the two values are not about equal, i.e., within some predetermined limits, then the routine loops back up to step 108 and reads the output of the second sensor 24 again, with STIME again incremented.

If the two values are considered equal, then the time value STIME is saved, step 114. This stored STIME value is now compared to a predetermined minimum time value (MT) representing the time required to deplete the oxygen stored in the catalyst 18 at the particular engine RPM and load at which the vehicle is operating, step 116. If the time value STIME is greater than the minimum time (MT) value, then an output is generated that the catalyst passed the warm test, step 118. If the STIME value is not greater than MT, then the routine will output a message that the catalyst failed the warm test, step 120. A determination of oxygen storage thus can be made and this oxygen storage data can be used to determine catalyst deterioration. Further, it can be combined with the light-off time data to even better determine catalyst deterioration.

Thus, there are three main tests that are conducted through all of the routines, an initial test that can detect if one of the sensors has failed or if one of the sensors needs calibration, a test for the light-off time of the catalyst and a test for the time it takes the catalyst to deplete oxygen. For the second two tests, if passed, then the catalyst is judged good, i.e., exhibits acceptable oxygen storage characteristics. If it fails either of these catalyst tests, then the catalyst is judged as deteriorated and this message is communicated to other routines within the controller 26 or other on-board processor of the vehicle where next steps might include running a catalyst rejuvenation cycle, re-checking the catalyst condition or declaring the catalyst to be defective.

While certain embodiments of the present invention have been described in detail, those familiar with the art to which this invention relates will recognize various alternative designs and embodiments for practicing the invention as defined by the following claims.

We claim:

1. A method of testing a catalyst used in the exhaust stream of an internal combustion engine while the engine is operating after a start-up, with the engine having a first oxygen sensor mounted in the exhaust stream upstream of the catalyst and a second oxygen sensor mounted in the exhaust stream downstream of the catalyst, the method comprising the steps of:

operating the engine with a lean air/fuel ratio;

determining an engine temperature parameter;

comparing the temperature parameter to a first predetermined temperature value;

comparing the time since engine start-up to a first predetermined time value;

reading the outputs of the first and the second sensors if the temperature parameter is less than the first predetermined temperature value and the time since start-up is less than the first predetermined time value;

computing the difference between the output from the first sensor and the output from the second sensor;

creating an output error message if the difference is greater than a predetermined difference value; and recalibrating one of the first and second sensors if the difference is less than the predetermined difference value and the outputs are not equal.

2. The method of claim 1 wherein the step of reading the outputs includes reading a plurality of output values from the first sensor and reading a plurality of output values from the second sensor and averaging the outputs for each sensor, respectively; and the step of computing the difference includes computing the difference between the averaged output from the first sensor with the averaged output from the second sensor.

3. The method of claim 2 further comprising the steps of:

comparing the time from engine start-up to a second predetermined time value;

obtaining the outputs of the first and the second sensors if the time from engine start-up is less than the second predetermined time value;

computing a second difference value between the output from the first sensor and the output from the second sensor;

comparing the second difference to a second predetermined difference value;

storing the time since engine start-up if the second difference is greater than the second predetermined difference value;

returning to the comparing the time from engine start-up step if the second difference is not greater than the second predetermined difference value; and creating an output catalyst error message if the time since engine start-up is greater than the second predetermined time value and the second difference is not greater than the second predetermined difference value.

4. The method of claim 1 further comprising:

comparing the time from engine start-up to a second predetermined time value;

obtaining the outputs of the first and the second sensors if the time from engine start-up is less than the second predetermined time value;

computing a second difference value between the output from the first sensor and the output from the second sensor;

comparing the second difference to a second predetermined difference value;

storing the time since engine start-up if the second difference is greater than the second predetermined difference value;

returning to the comparing the time from engine start-up step if the second difference is not greater than the second predetermined difference value; and creating an output catalyst error message if the time since engine start-up is greater than the second predetermined time value and the second difference is not greater than the second predetermined difference value.

5. The method of claim 4 wherein the step of obtaining the outputs includes reading a plurality of output values from the first sensor and reading a plurality of output values from the second sensor and averaging the outputs for each sensor, respectively; and the step of computing the second difference includes computing the difference between the averaged output from the first sensor and the averaged output from the second sensor.

6. A method of testing a catalyst used in the exhaust stream of an internal combustion engine while the engine is operating after a start-up, with the engine having a first oxygen sensor mounted in the exhaust stream upstream of the catalyst and a second oxygen sensor mounted in the exhaust stream downstream of the catalyst, the method comprising the steps of:

operating the engine with a lean air/fuel ratio;

comparing the time from engine start-up to a first predetermined time value;

obtaining the outputs of the first and the second sensors if the time from engine start-up is less than the first predetermined time value;

computing a first difference value between the output from the first sensor and the output from the second sensor;

comparing the first difference to a first predetermined difference value;

storing the time since engine start-up if the first difference is greater than the first predetermined difference value;

returning to the step of comparing the time from engine start-up if the first difference is not greater than the first predetermined difference value; and creating an output catalyst error message if the time since engine start-up is greater than the first predetermined time value and the first difference is not greater than the first predetermined difference value.

7. The method of claim 6 further including the steps of:

determining an engine temperature parameter;

comparing the temperature parameter to a first predetermined temperature value;

comparing the time since engine start-up to a second predetermined time value;

reading a plurality of output values from the first sensor and reading a plurality of output values from the second sensor and averaging the outputs for each of the sensors, respectively, if the temperature parameter is less than the first predetermined temperature value and the time since start-up is less than the second predetermined time value;

computing a second difference between the averaged output from the first sensor and the averaged output from the second sensor;

creating an output error message if the second difference is greater than a second predetermined difference value; and recalibrating one of the first and second sensors if the second difference is less than the second predetermined difference value and the outputs are not equal.

8. The method of claim 7 wherein the step of obtaining the outputs includes obtaining a plurality of output values from the first sensor and obtaining a plurality of output values from the second sensor and averaging the outputs for each sensor, respectively; and the step of computing a first difference includes computing the first difference between the averaged output from the first sensor and the averaged output from the second sensor.

9. A method of testing a catalyst used in the exhaust stream of an internal combustion engine while the engine is operating after a start-up, with the engine having a first oxygen sensor mounted in the exhaust stream upstream of the catalyst and a second oxygen sensor mounted in the exhaust stream downstream of the catalyst, the method comprising the steps of:

operating the engine with a lean air/fuel ratio;

determining an engine temperature parameter;

comparing the temperature parameter to a first predetermined temperature value;

comparing the time since engine start-up to a first predetermined time value;

reading the outputs of the first and the second sensors if the temperature parameter is less than the first predetermined temperature value and the time since start-up is less than the first predetermined time value;

computing the difference between the output from the first sensor and the output from the second sensor;

creating an output error message if the difference is greater than a predetermined difference value;

recalibrating one of the first and second sensors if the difference is less than the predetermined difference value and the outputs are not equal;

comparing the time from engine start-up to a second predetermined time value;

obtaining the outputs of the first and the second sensors if the time from engine start-up is less than the second predetermined time value;

computing a second difference value between the output from the first sensor and the output from the second sensor;

comparing the second difference to a second predetermined difference value;

storing the time since engine start-up if the second difference is greater than the second predetermined difference value;

returning to the comparing the time from engine start-up step if the second difference is not greater than the second predetermined difference value; and creating an output catalyst error message if the time since engine start-up is greater than the second predetermined time value and the second difference is not greater than the second predetermined difference value.

10. The method of claim 9 wherein the step of reading the outputs includes reading a plurality of output values from the first sensor and reading a plurality of output values from the second sensor and averaging the outputs for each sensor, respectively; and the step of computing the difference includes computing the difference between the averaged output from the first sensor with the averaged output from the second sensor.

11. The method of claim 10 wherein the step of obtaining the outputs includes reading a plurality of output values from the first sensor and reading a plurality of output values from the second sensor and averaging the outputs for each sensor, respectively; and the step of computing the second difference includes computing the difference between the averaged output from the first sensor and the averaged output from the second sensor.

\* \* \* \* \*